UNITED STATES PATENT OFFICE.

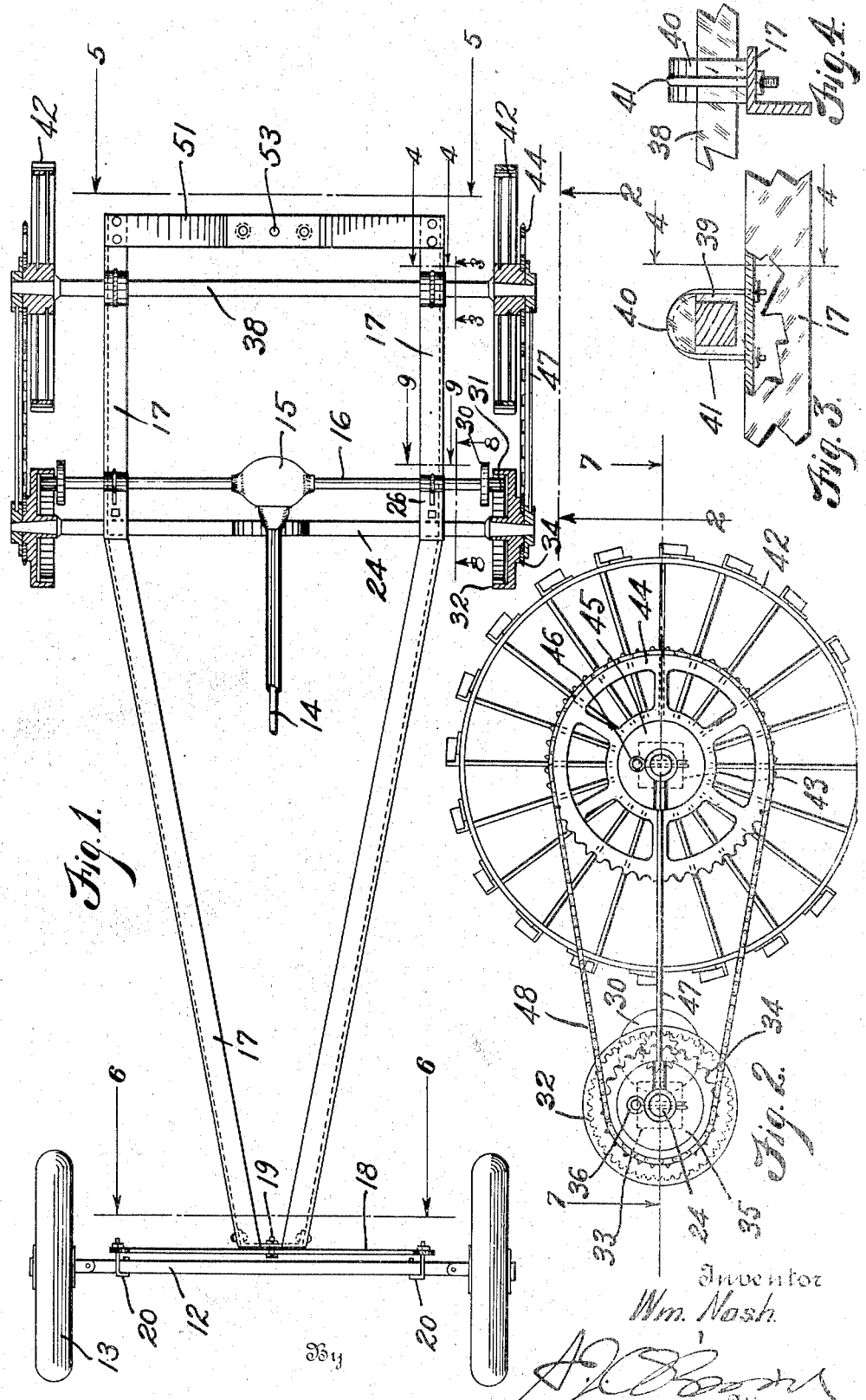

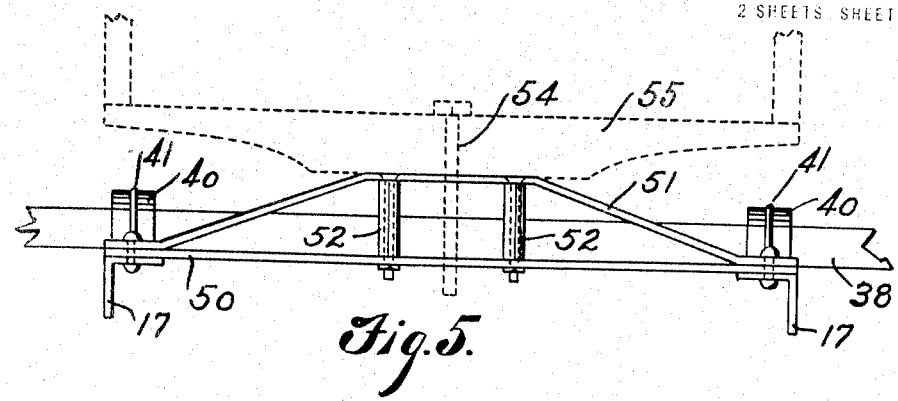
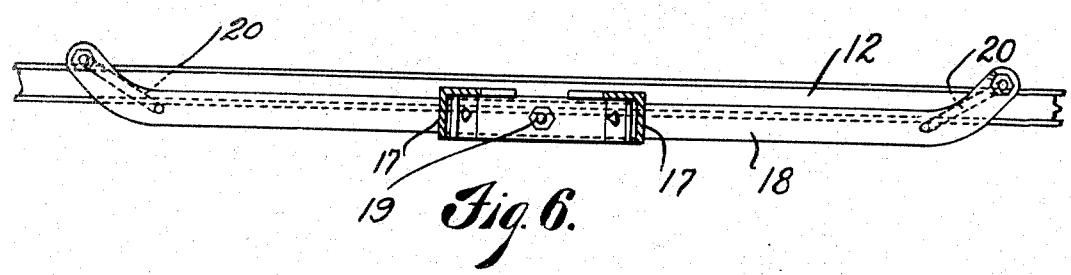
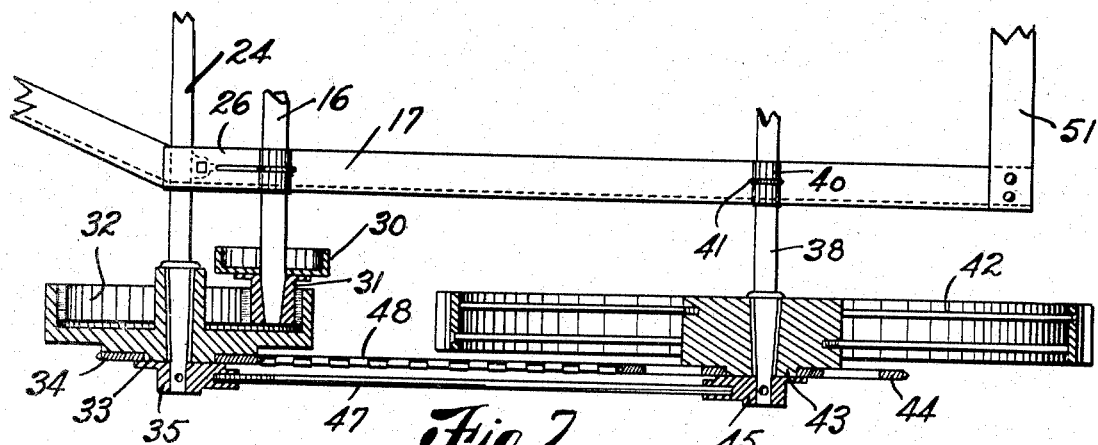
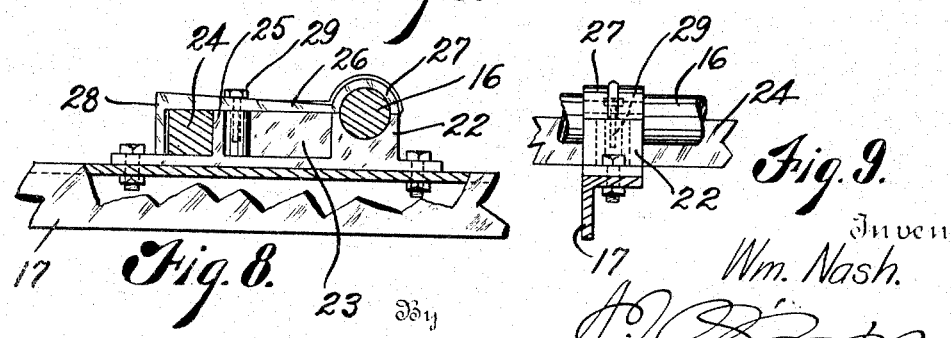

WILLIAM NASH, OF DENVER, COLORADO, ASSIGNOR TO THE NASH TRACTOR COMPANY, OF DENVER, COLORADO, A CORPORATION OF COLORADO.

TRACTOR.

1,325,853.      Specification of Letters Patent.      Patented Dec. 23, 1919.

Application filed November 13, 1917. Serial No. 201,732.

*To all whom it may concern:*

Be it known that I, WILLIAM NASH, a citizen of the United States, residing at the city and county of Denver and State of Colorado, have invented certain new and useful Improvements in Tractors; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to tractor structure and the object thereof is to obtain a cheap machine and also one which is readily adaptable for use either for power or for speed.

The invention consists of a chassis to which are connected the front wheels and the axle, the power plant and the rear axle of an automobile, the chassis having a pair of tractor wheels and a gear system including two interchangeable sprockets by means of which either speed or power may be obtained.

In the accompanying drawings,

Figure 1 is a plan view of the chassis with the transmission system in horizontal section.

Fig. 2 is a side elevation on an enlarged scale of the transmission system as indicated by the line and arrows 2—2, Fig. 1.

Fig. 3 shows the connection of the tractor axle to the chassis and is taken on the line 3—3, Fig. 1.

Fig. 4 is another view of the same connection on the line 4—4, of Figs. 1 and 3.

Fig. 5 is a view indicated by the line 5—5, Fig. 1, showing the construction of the rear of the chassis for connecting with the forward portion of a wagon body which is to be used as a trailer, the bolster thereof being in dotted lines.

Fig. 6 is a view on the line 6—6, Fig. 1, showing the construction of the forward portion of the chassis for connection with the front axle of an automobile.

Fig. 7 is a horizontal section on the line 7—7, Fig. 2, showing part of the transmission mechanism being like part of Fig. 1 but on a larger scale.

Figs. 8 and 9 are views on the lines 8—8 and 9—9, respectively of Fig. 1, indicating how the rear automobile axle is attached to the tractor chassis.

The front axle 12 and wheels 13 and the power plant, including the drive shaft 14, differential 15 and rear axle and housing 16 of an ordinary automobile are used on a chassis 17 having a gear and sprocket system and tractor wheels.

The forward end of the chassis carries a bar 18 pivotally connected thereto by a bolt 19, the bar being attached to the axle 12 by hooks 20. By this pivotal connection tilting movement of either member is not transmitted to the other.

The axle 16 is mounted on the side bars of the chassis by means of bearings 22 on a block 23 (Figs. 8 and 9) bolted to the chassis. A shaft 24 also rests on the block 23 bearing against a shoulder 25 thereon. The axle 16 and the shaft 24 are held to the block 23 by means of a cap plate 26 having a circular portion 27 to engage over the axle and an angular portion 28 to engage the two exposed sides of the shaft 24. The cap plate is secured to the block by a set screw 29.

Secured to each end of the axle 16 and its brake box 30 is a pinion 31 which engages with an internal gear 32 mounted on the end of the shaft 24. The gear 32 has a square boss 33 on which is mounted a small sprocket 34 which is held in place on the shaft end by a cap 35 secured to the shaft by a cotter pin 36.

A shaft 38 is mounted on the rear of the chassis, being held at each end in two blocks 39 and 40 which are secured by means of a U-bolt 41 anchored to the chassis. On this shaft 38 are mounted tractor wheels 42, the hub of each wheel having a square boss 43 on which is mounted a large sprocket 44 held in place by a cap 45 secured to the shaft end by a cotter pin 46. Anchored in the caps 35 and 45 are spacing rods 47 which aid in maintaining the relative location of the sprockets 34 and 44.

A sprocket chain 48 engages the sprockets and transmits power from one to the other. When the machine is being used as a tractor and power is desired, the sprockets are arranged as shown in the drawings. However, it is desirable to make greater speed when going to and from the fields. To accomplish this the cotter pins 36, 46 are removed and the retaining caps 35, 45 drawn from the ends of the shafts. The sprockets may then be removed from their seats and interchanged, the caps and cotter pins being replaced. The sprocket 44 being larger than sprocket 34, it will readily be seen that increased speed will be obtained by the change.

In Fig. 5, the construction of the rear of the chassis is shown, whereby a wagon may be used as a trailer. This comprises a plate 50 connecting the sides of the chassis 17 and a truss plate 51 spaced therefrom at the middle by sleeves 52. Each of the plates 50 and 51 has an aperture 53 therein (Fig. 1). The front wheels and axle are removed from the wagon and the king-bolt 54 in the bolster 55 is inserted into the apertures 53.

The operation of the tractor is clear from the foregoing description and no further explanation thereof is deemed necessary.

What I claim is:

1. In a motor vehicle, the combination of a chassis, a power driven axle mounted on the chassis, a shaft, a gear on the shaft, driving connection between the gear and the axle, a sprocket removably connected with said gear, a second shaft on the chassis, a wheel on the last named shaft, a sprocket removably connected with the wheel to transmit power thereto, means for transmitting power from the first named sprocket to the other sprocket, the sprockets being of unequal size and interchangeable.

2. In a motor vehicle, the combination of a chassis, a power driven axle mounted on the chassis, a shaft, a gear on the shaft, driving connection between the gear and the axle, a sprocket removably connected with said gear, a second shaft on the chassis, a wheel on the second shaft, a sprocket removably connected with the wheel to transmit power thereto, means for transmitting power from the first named sprocket to the other sprocket, the sprockets being of unequal size and interchangeable, a cap holding each sprocket in place, and a spacing rod having its ends mounted in the caps to hold the sprockets in properly spaced position.

3. In a motor vehicle, the combination with a chassis having rear wheels mounted thereon, of a bar pivotally connected at its middle with the middle of the front portion of the chassis, means on the ends of said bar engaging the front axle, and wheels on the axle.

4. In a motor vehicle, the combination with a chassis having rear wheels mounted thereon, of a bolt mounted in the middle of the front part of the chassis, a bar through the middle of which said bolt passes whereby the bar is pivotally mounted on the chassis, means on the end of said bar, an axle engaged and held in position by said means, and wheels on the axle.

In testimony whereof I affix my signature.

WILLIAM NASH.